United States Patent [19]

Brown et al.

[11] Patent Number: 4,941,120

[45] Date of Patent: Jul. 10, 1990

[54] FLOATING POINT NORMALIZATION AND ROUNDING PREDICTION CIRCUIT

[75] Inventors: Jeffrey D. Brown; Donald L. Freerksen; Scott A. Hilker; Daniel L. Stasiak, all of Rochester, Minn.

[73] Assignee: International Business Machines Corporation, Armonk, N.Y.

[21] Appl. No.: 339,347

[22] Filed: Apr. 17, 1989

[51] Int. Cl.⁵ .................................................. G06F 7/38
[52] U.S. Cl. ....................................... 364/748; 364/745
[58] Field of Search ................................. 364/748, 745

[56] References Cited

U.S. PATENT DOCUMENTS

| | | | |
|---|---|---|---|
| 3,621,218 | 11/1971 | Nishimoto | 364/766 |
| 4,612,628 | 9/1986 | Beauchamp et al. | 364/745 |
| 4,639,887 | 1/1987 | Farmwald | 364/748 |
| 4,754,422 | 6/1988 | Sakai et al. | 364/761 |
| 4,758,972 | 7/1988 | Frazier | 364/745 |
| 4,779,220 | 10/1988 | Nukiyama | 364/748 |
| 4,796,217 | 1/1989 | Takahashi et al. | 364/745 |

OTHER PUBLICATIONS

Finney et al, "Rounding IEEE Floating Point Results", IBM Tech. Disclosure Bull. vol. 27, No. 5, Oct. 1984, pp. 3138–3140.

Primary Examiner—Gary V. Harkcom
Assistant Examiner—Tan V. Mai
Attorney, Agent, or Firm—Paul L. Sjoquist

[57] ABSTRACT

Apparatus for enhancing certain floating point arithmetic operations, by examining the initial operands and the exponent and fractional results and predicting when the steps of postnormalization and rounding can be skipped. The fraction result format enables a prediction of normalization and rounding under each of the addition, subtraction and multiplication possibilities, and under each of the various choices of rounding mode which are used in floating point arithmetic.

4 Claims, 3 Drawing Sheets

FLOATING POINT NORMALIZATION AND ROUNDING PREDICTION CIRCUIT

BACKGROUND OF THE INVENTION

The present invention relates to a an apparatus for performing certain floating point arithmetic operations in a data processing system. More particularly, the invention relates to an apparatus simplifying the completion of floating point arithmetic operations by pre-normalizing both operands, checking both operands for the existence of certain bit patterns, performing a floating point operation on the operands, and either postnormalizing the operation's result if certain operand conditions are not met or producing the operation's result directly if the operand conditions are met.

The use of floating point arithmetic operations in a data processing system has been a common practice practically since the inception of computer technology. The development of floating point arithmetic hardware has taken many forms, usually with the objectives of simplifying the hardware construction, or enhancing the speed of the arithmetic processing operation. The four arithmetic operations of add, subtract, multiply and divide have usually been accomplished by using specialized subsets of processes involving addition and subtraction. For example, multiplication operations have in many cases been performed by repeated addition processes, and division has been accomplished by a process of repeated subtraction. The efforts made to speed up these processing operations have focused on enhancements and simplifications of hardware circuit design, particularly the adder circuit, which ultimately limits the maximum processing speed of all arithmetic operations. In the case of division, efforts have been made to increase the speed of operation by calculating partial quotients, or by simultaneously predicting multiple quotient bits, to reduce the number of addition or subtraction iterations required for the divide calculation.

An American national standard has been developed in order to provide a uniform system of rules for governing the implementation of floating point arithmetic systems. This standard is identified as ANSI/IEEE Standard No. 754-1985, and is incorporated by reference herein. In the design of floating point arithmetic systems and algorithms, it is a principal objective to achieve results which are consistent with this standard, to enable users of such systems and algorithms to achieve conformity in the calculations and solutions to problems even though the problems are solved using different computer systems. The standard specifies basic and extended floating point number formats, arithmetic operations, conversions between integer and floating point formats, conversions between different floating point formats, conversions between basic format floating point numbers and decimal strings, and the handling of certain floating point exceptions The typical floating point arithmetic operation may be accomplished in either single precision or double precision format. Each of these formats utilizes a sign, exponent and fraction field, where the respective fields occupy predefined portions of the floating point number. In the case of a 32-bit single precision number the sign field is a single bit occupying the most significant bit position; the exponent field is an 8-bit quantity occupying the next-most significant bit positions; the fraction field occupies the least significant 23-bit positions. In the case of a double precision floating point number the sign field is a single bit occupying the most significant bit position; the exponent field is an 11-bit field occupying the next-most significant bit positions; the fraction field is a 52-bit field occupying the least significant bit positions.

After each floating point answer is developed, it must be normalized and then rounded. When the answer is normalized, the number of leading zeros in the fraction field is counted. This number is then subtracted from the exponent and the fraction is shifted left until a "1" resides in the most significant bit position of the fraction field. Certain floating point answers cannot be normalized because the exponent is already at its lowest possible value and the most significant bit of the fraction field is not a "1".

In designing the hardware and logic for performing floating point arithmetic operations in conformance with ANSI/IEEE Standard 754-1985, it is necessary and desirable to incorporate certain additional indicator bits into the floating point hardware operations. These indicator bits are injected into the fraction field of the floating point number, and are used by the arithmetic control logic to indicate when certain conditions exist in the floating point operation. For example, an "implicit" bit I is created by the arithmetic control logic when the exponent of the floating point number has a nonzero value. The implicit bit I is created at the time a floating point number is loaded into the arithmetic registers, and the implicit bit I occupies the first bit position in the fraction field of the number. In addition, a "guard" bit G is set by the floating point control logic during certain arithmetic operations, as an indicator of the loss of precision of the floating point number being processed. The G bit is set when a right shift, required for normalization, shifts a significant bit off the right side of the register capacity. For single precision numbers the G bit occupies bit position 25 in the fraction field; for double precision numbers the G bit occupies position 54 in the fraction field. A "round" bit R is similarly used for certain floating point arithmetic operations, and is set by the arithmetic control logic, and the R bit occupies bit position 26 in the fraction field of a single precision number, and bit position 55 in the fraction field of a double precision number. Finally, a "sticky" bit S is an indicator bit which is set in certain floating point arithmetic operations when any lower precision bit is a "1", as an indicator that the floating point number has lost some precision. The S bit occupies position 27 of the fraction field in a single precision floating point number, and position 56 in the fraction field of a double precision floating point number.

The three extra bits in the fraction field are used exclusively for rounding operations, after the result has been normalized. The guard (G) and round (R) bits are treated as if they are a part of the fraction; they are shifted with the rest of the fraction, and included in all arithmetic. The sticky (S) bit is not shifted with the fraction, but is included in the arithmetic. It acts as a "catcher" for 1's shifted off the right of the fraction; when a 1 is shifted off the right side of the fraction, the S bit will remain a 1 until normalization and rounding are finished.

In a rounding operation there are typically four modes of rounding which are used, as follows:
(1) round to nearest;
(2) round to positive infinity;
(3) round to negative infinity;

(4) round to zero.

The "round to nearest" mode means that the value nearest to the infinitely precise result should be delivered. If the two nearest representable values are equally near the one with its least significant bit zero shall be delivered. The "round to positive infinity" mode means that the value closest to and not less than the infinitely precise result should be delivered. The "round to negative infinity" mode means that the value closest to and not greater than the infinitely precise result should be delivered. The "round to zero" mode means that the result delivered should be the closest to but not greater in magnitude than the infinitely precise result. If none of the G, R, and S bits are a "1"1, no rounding will be accomplished regardless of the mode of rounding selected.

Unfortunately, any arithmetic circuit utilizing an adder for carrying out an addition or subtraction inevitably involves the generation of carry bits which are propagated from least significant bit positions to more significant bit positions, and can in fact be propagated throughout all bit positions during an arithmetic operation. This has the affect of extending the processing time required for completing a calculation, and various design efforts have been made to deal with this problem. For example, U.S. Pat. No. 4,754,422, issued June 28, 1988, discloses a dividing apparatus utilizing three carry-save adders in an effort to produce a plurality of quotient bits during each iteration or cycle of arithmetic operation. U.S. Pat. No. 3,621,218, issued Nov. 16, 1971,discloses a high-speed divider utilizing a single carry-save adder for producing a plurality of quotient bits during each iteration of the arithmetic operation, and a plurality of registers for holding a sequence of partial quotients used in the operation.

U.S. Pat. No. 4,639,887, issued Jan. 27, 1987, discloses an apparatus for decreasing the latency time associated with floating point addition and subtraction. The invention uses duplicate hardware for the calculation of the arithmetic operation on the fraction portion of a floating point number, and then selects a resultant value based upon exponent differences.

In any floating point operation in a data processing system it is desirable to increase the efficiency of one or more of the floating point operations, for an increase in this efficiency translates directly into a proportionate time savings in systems operation. Certain efficiencies are possible in specialized situations, some of which are illustrated in the foregoing prior art disclosures, and it is important to take advantage of these efficiencies, particularly if the special situations may be encountered relatively frequently during the course of data processing operations. For example, floating point arithmetic calculations frequently require a normalize operation when an answer is developed, and a rounding operation if the answer is inexact. However, either or both of these operations may be skipped when certain result conditions exist, thereby saving the time otherwise required for executing these operations. In floating point multiply operations the normalize and rounding steps can be eliminated approximately 50% of the time, depending upon certain operating conditions, and for floating point addition and subtraction operations the normalize and rounding steps can be eliminated about 25% of the time, depending upon operating conditions. By eliminating these steps when conditions suggest that elimination is possible, an overall savings in computer processing time is achieved.

It is a principal object of the present invention to provide an apparatus and method for floating point arithmetic operations, wholly in conformance with ANSI/IEEE Standard No. 754-1985.

It is a further object of the present invention to provide an apparatus and method for achieving certain floating point arithmetic operations in a shorter time period than previously obtained, through the selective reduction in the number of machine cycles required to provide these operations.

It is a further object of the present invention to provide an apparatus and method for predicting when postnormalization and rounding operations may be skipped, to achieve a desirable reduction in the processing time.

SUMMARY OF THE INVENTION

The invention includes circuits for examining the operands in floating point multiplication, addition or subtraction operations for conditions which predict when the postnormalization step can be skipped. The invention also includes circuits for examining the fraction and exponent results of such floating point operations to determine whether the rounding step can be skipped. The invention further includes circuits for shortening the post processing operations when the requisite conditions are present, thereby enhancing the efficiency of these floating point operations.

DESCRIPTION OF THE PREFERRED EMBODIMENT

Figure 1:
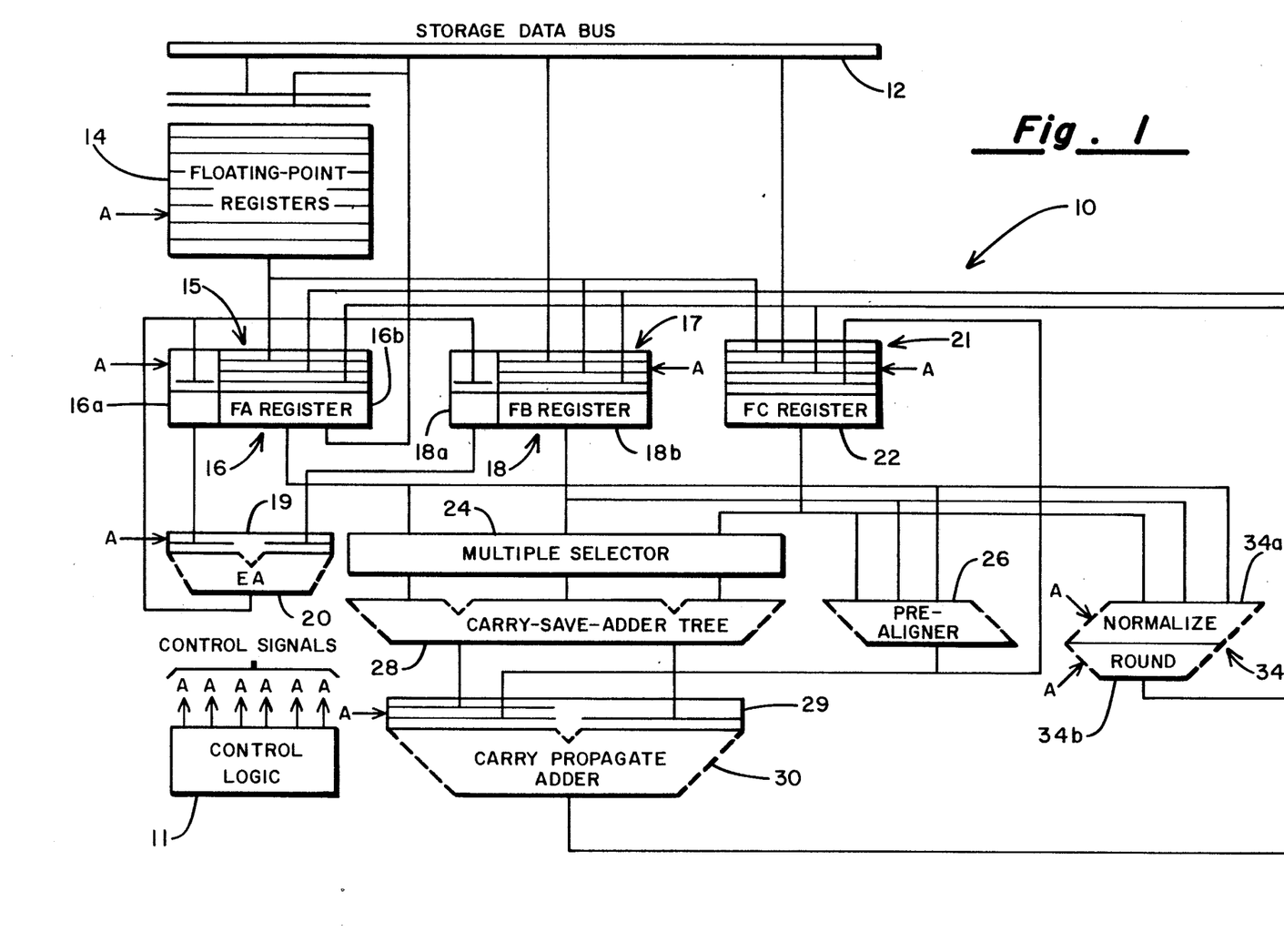
FIG. 1 shows a block diagram of a floating point arithmetic circuit used with the present invention.

Referring first to FIG. 1, there is shown a block diagram of the floating point arithmetic circuit which is used in conjunction with the present invention. The execution of floating point arithmetic utilizes this circuit because of the specific algorithms which must be performed to determine the proper results. This circuit presumes that the floating point numbers have been prearranged according to a particular format, where the most significant bit represents the sign of the floating point number, and wherein a group of the next-most significant bits represent the exponent of the floating point number, and wherein the remaining bits represent the fraction value of the number; i.e., the fraction value presuming that binary point is placed at the left-most end of the fraction value In the case of floating point arithmetic utilizing single precision calculations wherein the size of the number is 32-bits, the sign bit is presumed to be bit 0, the exponent bits are 1–8, and the fraction value bits are 9–31. In the case where the floating point arithmetic is accomplished utilizing double precision numbers, the sign bit is bit 0, the exponent bits are 1–11, and the fractional value bits are 12–63. In addition to the foregoing identified bits, the hardware registers and logic associated with FIG. 1 include four additional bits; the I bit occupies the most significant position in the fraction field, and the G, R and S bits respectively occupy the least significant bit positions in the fraction field.

Floating point operands cannot be added to or subtracted from each other unless their exponents are equal. This requires that their exponents be compared, and the operand fraction with the smaller exponent be shifted the amount of the exponent difference. The fractions can then be added or subtracted with the larger exponent as the result exponent. Multiplication of floating point operands requires that the exponents be added and the fractions multiplied. Division of floating point operands requires that the divisor exponent be subtracted from the dividend exponent and the dividend fraction be divided by the divisor fraction.

The floating point arithmetic circuit of FIG. 1 can support both single and double precision arithmetic operations. It is designed to support a floating point add or subtract operation, a 14-bit floating point multiply operation, or a 2-bit floating point divide operation.

The floating point arithmetic circuit 10 of FIG. 1 utilizes a storage data buss 12 for receiving and transmitting data from other sources, such as a data processing system or the like. Information received over data storage buss 12 may be transmitted into a plurality of floating point registers 14. In the preferred embodiment there are eight floating point registers 14, each adapted to hold the floating point operands and the results of floating point operations. Floating point registers 14 may transmit information to an FA register 16, an FB register 18, or an FC register 22. FA register 16 may also transmit information back to floating point registers 14.

The FA register 16 is a destination register for data from the floating point registers 14, and is the source register for data being transmitted to the floating point registers 14. The FA register 16 is also the source register for data which may be transferred to a memory via storage data buss 12, and it is a destination register for data transmitted from the carry-propagate adder 30 and from the normalize-round circuit 34. The FA register 16 has outputs to the multiple selector 24, the prealigner circuit 26, the normalize-round circuit 34, and the exponent adder 20. The FA register 16 contains the second operand for add, subtract, compare, multiply and divide operations. FA register 16 has a section 16a for holding the exponent of the floating point number, and a section 16b for holding the fraction portion of the floating point number.

In order to selectively control which of the plurality of inputs to the FA register 16 are to be gated into the register, the FA register 16 has an input multiplexer circuit 15 associated therewith. Multiplexer circuit 15 provides for the selective gating of the various inputs into register 16, under control of an activation signal A. Other registers in the floating point arithmetic circuit 10 have similar multiplexer input controls.

A control logic circuit 11 generates all of the activation signals required for data interchange and processing operations within floating point arithmetic circuit 10. Control logic circuit 11 has a plurality of control signal outputs, designated A, each of which serve as control inputs to various circuits and registers. It is well within the skill of the art to understand the need and design for a control logic circuit 11, as well as the activation signals A which are required for the operation of floating point arithmetic circuit 10; accordingly, a detailed presentation of these circuits and signals is not required herein.

The FB register 18 is a destination register for data received from the floating point registers 14, and a destination register for data from the carry-propagate adder 30, and from the normalize-round circuit 34, and from the storage data buss 12. It has outputs to the multiple selector 24, the prealigner circuit 26, and the exponent adder 20. The FB register is used to contain the first operand for the add, subtract, compare and divide operations; it also contains the intermediate result of the add, subtract and multiply operations. The FB register 18 has a section 18a for containing the exponent value of the floating point number, and a section 18b for containing the fraction portion of the floating point number, and has an input multiplexer circuit 17 for gating data into the register under control of activation signals from control logic circuit 11.

The FC register 22 is a destination register for data from memory via storage data buss 12, and a destination register for data from the carry-propagate adder 30 and from the normalize-round circuit 34. It is also the destination register from the floating point registers 14. The FC register 22 has outputs to the multiple selector 24, the prealigner circuit 26, and the normalize-round circuit 34. The FC register 22 is used to contain the first operand of the multiply operation, and it is the destination register for the result of a divide operation. An input multiplexer circuit 21 controls the gating of data into FC register 22, under control of activation signals from control logic circuit 11.

The exponent adder 20 is a 13-bit adder circuit that is used for exponent arithmetic. It handles the exponent calculations for either single or double precision exponents. The exponent adder is a source for data transmitted to FA register section 16a, and FB register section 18a. The exponent adder 20 has an input multiplexer circuit 19.

The prealigner circuit 26 is used to pre-shift the fraction with the smaller exponent for the add and subtract operation, which is necessary to make the floating point operand exponents equal prior to an add or subtract operation. The prealigner circuit 26 has the capability to shift a floating point fraction right from 0 to 55-bit positions, depending upon whether single or double precision arithmetic is being performed. The prealigner circuit 26 has an output to the carry-propagate adder 30, and to the FC register 22.

The multiple selector 24 is a logic circuit which generates multiples of the multiplicand for the multiply operation, and multiples of the divisor for the divide operation. For the divide operation, the multiples are decoded from the high-order bits of the dividend, or partial dividend, and of the divisor. The complement of the operand may be generated by the multiple selector when necessary. The multiple selector 24 receives data from the FA register 16, the FB register 18, and the FC register 22. The multiple selector 24 has outputs to the carry-save adder 28.

The carry-save adder 28 will permit three operands to be added together at the same time. This permits the use of a divide algorithm which generates two quotient bits per iteration. The carry-save adder 28 receives data from the multiple selector 24, and transmits data to the carry-propagate adder 30.

The carry-propagate adder 30 is a 57-bit adder, and has an input from the carry-save adder 28 for generating the partial product of a multiply operation or the partial dividend of a divide operation. The carrypropagate adder circuit 30 may also receive inputs from the prealigner circuit 26, the FA register 16, and the FB register 18. The carry-propagate adder has an output connection to the FA register 16 and the FB register 18. An input multiplexer circuit 29 controls the gating of data into carry-propagate adder 30, under control of activation signals A from control logic circuit 11.

The normalize-round circuit 34 is used to normalize the results of a floating point operation. For example, the result of a multiply operation may require a left-shift of 1-bit in order to normalize the fraction, and the result of an add or subtract operation may require a left-shift of up to 54-bit positions. The normalize-round circuit 34 also contains an incrementor circuit, for use in certain rounding operations, where the result may have to be incremented by a value of 1 in the low-order bit position.

After each floating point answer is developed, it must be normalized and then rounded. When the answer is normalized, the number of leading zeros is counted in the fraction portion of the floating point result. This number is then subtracted from the exponent portion of the floating point result, and the fraction is shifted left until a "1" resides in the most significant bit of the fraction. The following tables show an example of this process, wherein Table A illustrates a floating point result before normalization, and Table B illustrates the same floating point result after normalization:

TABLE A

Sign = 1
Exponent = 1111110
Fraction = 0.00110101010101010101011

TABLE B

Sign = 1
Exponent = 11111010
Fraction = 1.101010101010101010110000

The rounding operation utilizes three extra bits, in addition to the sign bit, exponent bits, and fraction bits typically found in a floating point number. These bits are referred to as the guard bit (G), the round bit (R) and the sticky bit (S). In double precision floating point operations these three extra bits are in bit positions 54–56, with the guard bit (G) in position 54, the round bit (R) in position 55, and the sticky bit (S) in position 56. In single precision numbers the guard bit (G) is found in position 25, the round bit (R) is found in position 26, and the sticky bit (S) is found in position 27. These three extra bits are used for rounding the normalized result, and they are treated as if they are part of the fraction. The G and R bits are shifted with all of the rest of the fraction, and they are included in all of the arithmetic.

Figure 2:
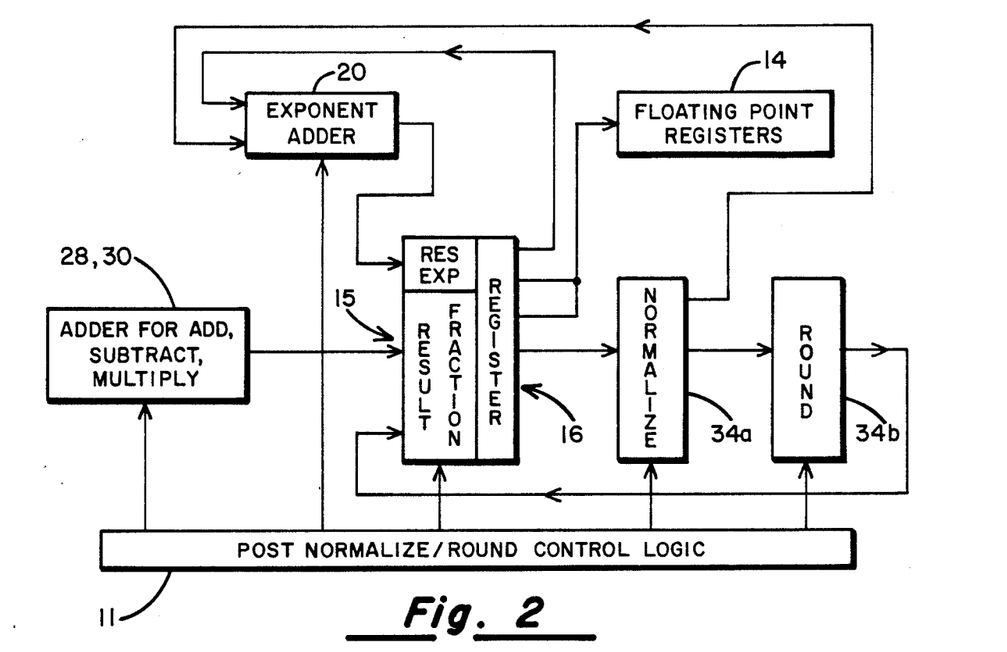
FIG. 2 shows a block diagram of a portion of the arithmetic circuit utilized for normalizing and rounding operations.

FIG. 2 shows a block diagram of a portion of the arithmetic circuit of FIG. 1 which is utilized for normalizing and rounding operations, according to prior art teachings. These normalizing and rounding operations are performed after the arithmetic operations have been concluded. The normal arithmetic operation consists first of a number of iterations for calculating the results, utilizing the circuit of FIG. 1, and at the conclusion of these calculation iterations the result value is loaded into register 16. The fraction result is loaded into register portion 16b and the exponent result is loaded into register portion 16a. Thereafter, normalization and rounding operations take place under control of the postnormalize/round control logic 11.

Figure 3:
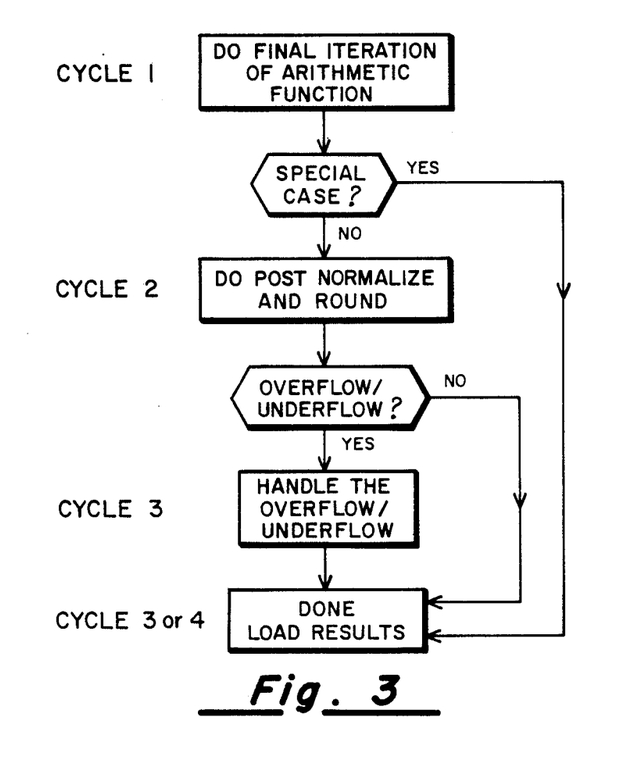
FIG. 3 shows a flow chart for postnormalization and rounding, as known in the prior art.

In the prior art the postnormalization and rounding is accomplished in three or four cycles, as shown in FIG. 3. The logic circuits required for making the decisions illustrated in FIG. 3 are located in control logic 11.

The first cycle of postnormalization and rounding occurs immediately after the final iteration of the arithmetic function. The arithmetic result is examined to determine whether it involves a "special" case, in which case control logic circuits 11 determine that no postnormalization or rounding is necessary and the results are directly loaded from register 16 into a floating point register 14. The "special" cases referred to above are so defined in ANSI/IEEE Standard 754-1985, as plus or minus infinity, not a number (NAN), and plus or minus zero (±). However, in most cases, the arithmetic result requires postnormalization and rounding, which is accomplished in a second cycle of operation. After this cycle is completed the result is examined for overflow/underflow, and if it is determined that none exists the results are loaded into a floating point register 14. If an overflow/underflow condition exists, a third cycle is completed for the purpose of handling the overflow/underflow condition according to the ANSI/IEEE Standard, and setting the appropriate indicators. After this cycle, the results are loaded into a floating point register 14.

Figure 4:
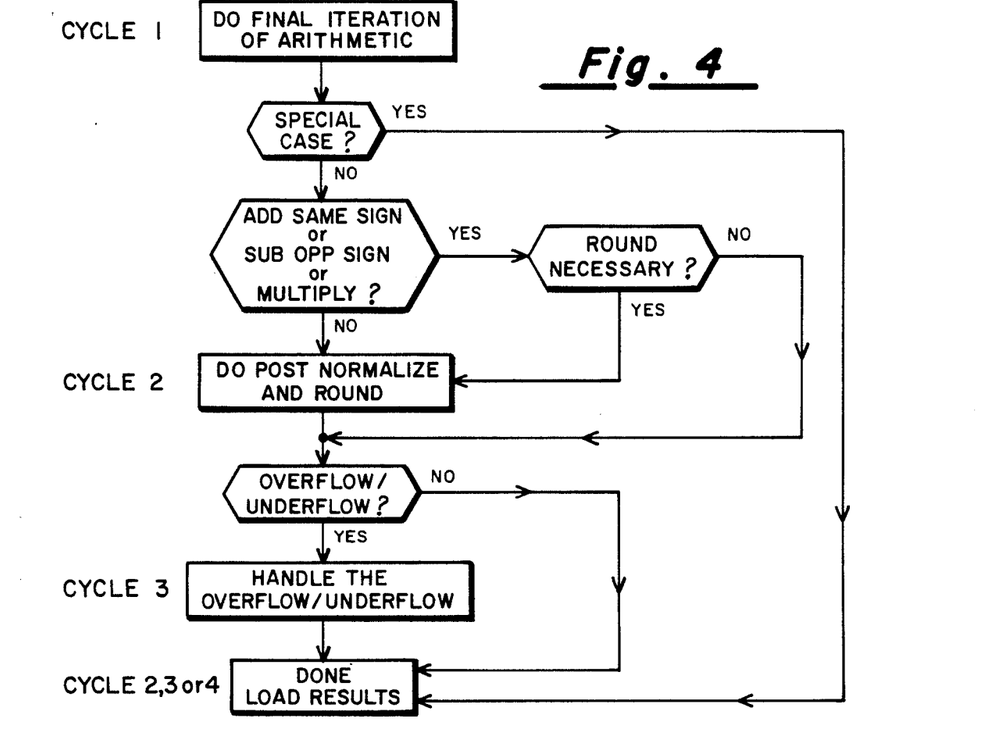
FIG. 4 shows a flow chart for postnormalization and rounding according to the teachings of the invention.

The present invention results from the recognition that certain original operands may satisfy specific requirements for multiply, add, or subtract which permit the postnormalization step to be skipped. It also results from the fact that certain resulting fractions may satisfy specific requirements to permit elimination of the rounding step. These possibilities enable the control logic 11 to be designed to make certain further decisions by way of predicting, in a specific case, whether normalizing and rounding operations are required. A flow chart showing the sequence of decisions which are made in order to make this prediction are shown in FIG. 4. These decisions are made immediately after the final iteration of the arithmetic operation has been completed, which is identified as "Cycle 1" in FIG. 4. If a special case exists, as defined hereinbefore, "Cycle 2" merely involves the transfer of the results into a floating point register 14. If a special case does not exist the examination associated with the present invention is implemented between Cycle 1 and Cycle 2. The arithmetic operation is examined to determine whether it is one of the three types to which the invention may be applied: (1) addition of two numbers having the same signs, (2) subtraction of two numbers having different signs, or (3) multiplication. If the arithmetic operation is none of these, the usual postnormalization and round operation is performed during Cycle 2. If the arithmetic operation is one of the three types, a determination is made as to whether a round operation is necessary. If a round operation is necessary the usual postnormalization and round operation is performed during Cycle 2. If a round operation is not necessary, the overflow/underflow condition is checked and handled, if necessary, and the results are transferred into a floating point register 14 (Cycle 2 or Cycle 3). The present invention permits, for certain arithmetic operations and certain results, the possibility of skipping the postnormalization and rounding steps, and in these cases Cycle 2 may simply be the step of transferring the result directly into the floating point register 14.

The postnormalization prediction for a multiply operation depends upon the requirement that both operands be pre-normalized before execution of the multiply instruction. This ensures that the resulting fraction will be either in the form 1.XXX... or 0.1XXX..., where X represents any value in the result. In other words, the resulting fraction is either already normalized or is one left-shift away from being normalized.

Once the logic determines that the original operands meet the requirements for a normalization prediction, the first bit of the resulting fraction is examined to see which answer should be delivered. If the most significant bit of the fraction adder 28, 30 is a "zero," the fraction is in the form 0.1XXX..., and the exponent will simply be the sum of the two exponents of the operands. If the most significant bit of the fraction adder 28, 30 is a "1," the fraction is in the form of 1.XXX..., and the exponent resulting from the addition of the two operand exponents will be increased by one. These operations are shown in the data flow chart of FIG. 5, and are illustrated in Table C. Referring to Table C, the column entitled "Norm" provides either an indication that the result is already normalized (none) or an indication that a left-shift of one position is required for normalization (SL1).

TABLE C

| Operation | Operand 1 | Operand 2 | Result | Norm |
|---|---|---|---|---|
| Multiply | 1.XX | 1.XX | 1.xx | None |
|  |  |  | 0.1x | SL1 |
|  | 1.XX | 0.XX | 1.xx | None |
|  |  |  | 0.1x | SL1 |
|  | 0.XX | 0.XX | 1.xx | None |
|  |  |  | 0.1x | SL1 |

Figure 5:
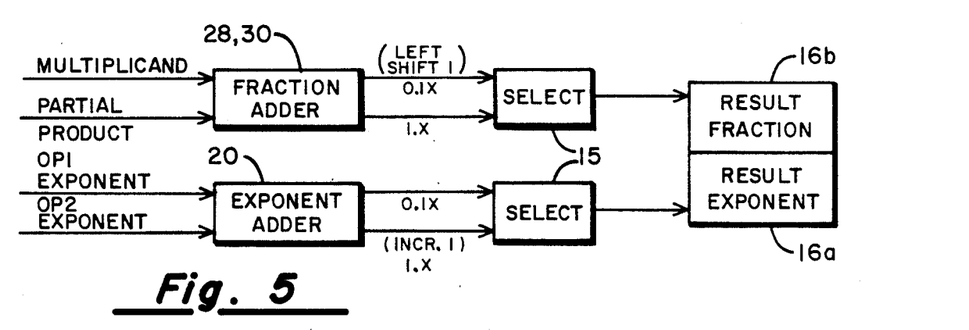
FIG. 5 shows a data flow chart for normalization and rounding in floating point multiply operations.

Referring to FIG. 5 and Table C, after the last iteration of a multiply operation the fractional results appears at the output of adders 28, 30. If the fractional result is in the form 0.1X it is transferred to register 16b via input multiplexer circuit 15 in a transfer operation which accomplishes a simultaneous left shift of one bit. If the fractional result is of the form 1.X, the result is transferred to register 16b via input multiplexer 15 directly, without a shifting operation. If the fractional result is of the form 1.X the exponent adder 20 output is increased by one and the exponent result is transferred into register 16a via input multiplexer 15. If the result is of the form 0.1X the exponent adder 20 result is directly transferred into register 16a via input multiplexer 15. In this manner, the 1-bit normalization, if required, may be accomplished during the transfer of data and without the necessity of executing a special postnormalization and round sequence.

The postnormalization prediction for addition and subtraction arithmetic operations is possible if an addition operation is performed wherein the signs of the original operands are the same, or a subtraction is performed wherein the signs of the original operands are opposite.

Figure 6:
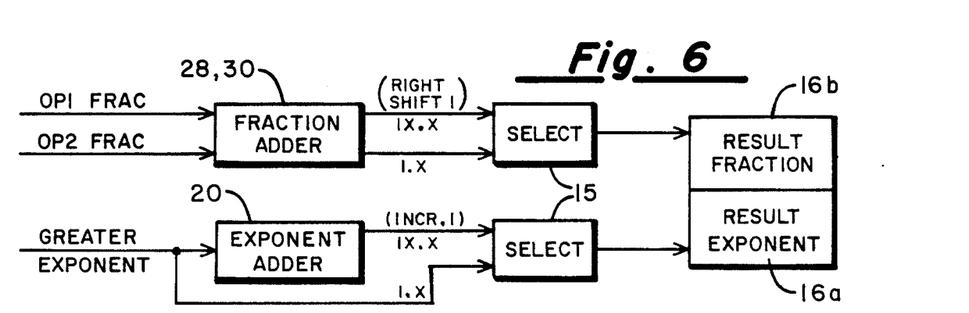
FIG. 6 shows a data flow chart for normalizing and rounding in floating point addition operations

Once it has been determined that the original operands meet the requirements for a normalization prediction, the carry bit of the resulting fraction is examined to determine which answer should be delivered. If the fraction adder 28, 30 shows a carry bit, then the resulting fraction is in the form 1X.XXX... and the fraction must be shifted right one position and the exponent increased by one. If the fraction adder 28, 30 shows no carry bit then the resulting fraction is in the form 1.XXX..., and no shifting is required, nor is there any requirement to modify the exponent. FIG. 6 shows the data flow chart for performing these operations in an addition or subtraction operation, and Table D illustrates the conditions which determine the fraction result format.

Referring to FIG. 6 and Table D, if the fraction result is of the form 1X.X, the transfer from the fraction adder 28, 30 is made to register 16b via input multiplexer 15 with a simultaneous right shift of 1-bit position. If the fractional result is of the form 1.X, the transfer is made directly through input multiplexer 15 into register 16b. If the fractional result is of the form 1X.X, the exponent result from exponent adder 20 is increased by one and transferred into register 16a via input multiplexer 15. If the fractional result is of the form 1.X the exponent is directly transferred into register 16a via input multiplexer 15. Since the result can never require more than a 1-bit shift, the normalization step is effectively accomplished during the data transfer.

In Table D, the column entitled "Norm" shows that the normalization prediction is made wherein the term SR1 indicates a right-shift of one position for normalization and the term "None" indicates that the numbers are already normalized.

TABLE D

| Operation | Operand 1 | Operand 2 | Exponent Difference | Result | Norm |
|---|---|---|---|---|---|
| Add OR | 1.XX | 1.XX | 0 | 1x.xx | SR1 |
| Subtract |  |  | >0 | 1x.xx | SR1 |
|  |  |  | >0 | 1.xx | None |
| Note: |  |  |  |  |  |
| Signs are | 1.XX | 0.XX | 0 | 1x.xx | SR1 |
| Same for |  |  | 0 | 1.xx | None |
| Add, and |  |  | >0 | 1x.xx | SR1 |
| Opposite |  |  | >0 | 1.xx | None |
| for Sub |  |  |  |  |  |

The rounding prediction, shown in FIG. 4, depends upon a specific examination of particular bits of the resulting fraction for an add, subtract or multiply operation. The particular bits to be examined are the lease significant bit of the resulting fraction (LSB), the guard bit of the resulting fraction (G), the round bit of the resulting fraction (R) and the sticky bit of resulting fraction (SIGN).

The round prediction also depends upon the particular rounding mode which has been selected in connection with the floating point arithmetic operation. The following Table E, which is derived from ANSI/IEEE Standard 754-1985, provides a prediction for rounding as a function of all of the foregoing factors, wherein the word "No" means that rounding is not required, and the word "yes" means that rounding is required for the particular conditions tabulated. The examination of all of the conditions necessary to formulate the rounding prediction is accomplished by the postnormalization and round control logic circuit 11, which is diagrammatically shown in FIG. 1 and FIG. 2. It will be readily understood by those skilled in the art that the particular conditions required to be sensed, in order to formulate the rounding prediction, may be readily identified by reference to the output of the carry-propagate adder 30 of FIG. 1 and/or FIG. 2.

TABLE E

| LSB | G | R | S | SIGN | Rounding Mode | | | |
|---|---|---|---|---|---|---|---|---|
| | | | | | Nearest | Pos Inf | Neg Inf | Zero |
| 0 | 0 | 0 | 0 | 0 | No | No | No | No |
| 0 | 0 | 0 | 1 | 0 | No | Yes | No | No |
| 0 | 0 | 1 | 0 | 0 | No | Yes | No | No |
| 0 | 0 | 1 | 1 | 0 | No | Yes | No | No |
| 0 | 1 | 0 | 0 | 0 | No | Yes | No | No |
| 0 | 1 | 0 | 1 | 0 | Yes | Yes | No | No |
| 0 | 1 | 1 | 0 | 0 | Yes | Yes | No | No |
| 0 | 1 | 1 | 1 | 0 | Yes | Yes | No | No |
| 1 | 0 | 0 | 0 | 0 | No | No | No | No |
| 1 | 0 | 0 | 1 | 0 | No | Yes | No | No |
| 1 | 0 | 1 | 0 | 0 | No | Yes | No | No |
| 1 | 0 | 1 | 1 | 0 | No | Yes | No | No |
| 1 | 1 | 0 | 0 | 0 | Yes | Yes | No | No |
| 1 | 1 | 0 | 1 | 0 | Yes | Yes | No | No |
| 1 | 1 | 1 | 0 | 0 | Yes | Yes | No | No |
| 1 | 1 | 1 | 1 | 0 | Yes | Yes | No | No |
| 0 | 0 | 0 | 0 | 1 | No | No | No | No |
| 0 | 0 | 0 | 1 | 1 | No | No | Yes | No |
| 0 | 0 | 1 | 0 | 1 | No | No | Yes | No |
| 0 | 0 | 1 | 1 | 1 | No | No | Yes | No |
| 0 | 1 | 0 | 0 | 1 | No | No | Yes | No |
| 0 | 1 | 0 | 1 | 1 | Yes | No | Yes | No |
| 0 | 1 | 1 | 0 | 1 | Yes | No | Yes | No |
| 0 | 1 | 1 | 1 | 1 | Yes | No | Yes | No |
| 1 | 0 | 0 | 0 | 1 | No | No | No | No |
| 1 | 0 | 0 | 1 | 1 | No | No | Yes | No |
| 1 | 0 | 1 | 0 | 1 | No | No | Yes | No |
| 1 | 0 | 1 | 1 | 1 | No | No | Yes | No |
| 1 | 1 | 0 | 0 | 1 | Yes | No | Yes | No |
| 1 | 1 | 0 | 1 | 1 | Yes | No | Yes | No |
| 1 | 1 | 1 | 0 | 1 | Yes | No | Yes | No |
| 1 | 1 | 1 | 1 | 1 | Yes | No | Yes | No |

In operation, the present invention is implemented after the final iteration has been completed for certain specific floating point arithmetic calculations, assuming that the calculations do not involve "special" cases as has been hereinbefore described. When the proper conditions exist the invention enables the postnormalization and rounding steps to be skipped, thereby saving one or more machine cycles in the overall calculation process. Fortunately, the required conditions usually exist in about 25–50 percent of the calculations, and the consequent savings in machine cycles can represent a meaningful savings in overall processing time.

The invention may be utilized for all floating point multiply operations, and for floating point addition operations wherein the quantities added have the same sign, and for floating point subtraction operations wherein the quantities being subtracted have different signs. Under these conditions, the two most significant bits of the result fraction are examined and, depending upon the bit combination, the normalization requirement is completely predictable. Either no normalization will be necessary, or normalization can be accomplished by a 1-bit left shift, or by a 1-bit right shift.

In order to make a rounding prediction it is necessary to examine certain other bits in the result fraction, as a function of the rounding mode selected for the arithmetic operation. The relative positions of the examined bits are well known, and it is a matter of conventional design to implement the appropriate sensing logic into control logic circuits 11. The bits which must be examined are the resulting fraction least significant bit, the guard bit (G), the round bit (R), the sticky bit (S), and the sign bit. Depending upon the rounding mode selected for the arithmetic instruction, every combination of these five bits will lead to a rounding prediction which may be followed. If no rounding is predicted the postnormalization and rounding steps can be skipped entirely, with a consequent saving in machine cycle time. If a rounding prediction is made the postnormalization and rounding sequence can be implemented in the usual manner.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A circuit for normalizing floating point arithmetic results of certain predetermined types, and for predicting whether rounding is necessary by examination of predetermined bits in the arithmetic result, comprising
   (a) means for detecting arithmetic operations of the multiply type, and addition of operands of same sign, and subtraction of operands of different signs, and activating a transfer sequence in response thereto;
   (b) said transfer sequence including means for examining the two most significant bits of the result fraction and completing a transfer of the fraction and exponent result into a register according to the following procedure:
      (i) if a multiply type and the two most significant fraction bits are of the form 1.X, transfer the results directly into said register, and increase the exponent by one;
      (ii) if a multiply type and the two most significant fraction bits are of the form 0.1, transfer the fractional result into said register with a 1-bit left shift, and transfer the exponent directly, unchanged, into said register;
      (iii) if an addition or subtraction type and the two most significant fraction bits are of the form 1.X, transfer the results directly into said register; and
      (iv) if an addition or subtraction type and the two most significant fraction bits are of the form 1X., transfer the fractional results directly into said register; with a 1-bit right shift, and transfer the exponent, increased by one, into said register.

2. The circuit of claim 1, further comprising means for examining the result sign bit, least significant bit, guard bit, round bit and sticky bit; and means for detecting the rounding mode selected for the arithmetic operation; and means for predicting whether a rounding of the fractional result is necessary as a consequence of said examination of result sign bit, least significant bit, guard bit, round bit and sticky bit, and said means for detecting the rounding mode selected.

3. The circuit of claim 2, further comprising means for skipping the rounding as result of said means for predicting.

4. The circuit of claim 3, wherein said means for predicting further comprises a plurality of logic circuits coupled to said means for examining the result sign bit, least significant bit, guard bit, round bit and sticky bit, and coupled to said means for detecting the selected rounding mode, said plurality of logic circuits including a decision network for activating said means for skipping round according to the following tabulation, where "No" signifies skipping rounding:

| L S B | G | R | S | S I G N | Rounding Mode | | | |
|---|---|---|---|---|---|---|---|---|
| | | | | | Nearest | Pos Inf | Neg Inf | Zero |
| 0 | 0 | 0 | 0 | 0 | No | No | No | No |
| 0 | 0 | 0 | 1 | 0 | No | Yes | No | No |
| 0 | 0 | 1 | 0 | 0 | No | Yes | No | No |
| 0 | 0 | 1 | 1 | 0 | No | Yes | No | No |
| 0 | 1 | 0 | 0 | 0 | No | Yes | No | No |
| 0 | 1 | 0 | 1 | 0 | Yes | Yes | No | No |
| 0 | 1 | 1 | 0 | 0 | Yes | Yes | No | No |
| 0 | 1 | 1 | 1 | 0 | Yes | Yes | No | No |
| 1 | 0 | 0 | 0 | 0 | No | No | No | No |
| 1 | 0 | 0 | 1 | 0 | No | Yes | No | No |
| 1 | 0 | 1 | 0 | 0 | No | Yes | No | No |
| 1 | 0 | 1 | 1 | 0 | No | Yes | No | No |
| 1 | 1 | 0 | 0 | 0 | Yes | Yes | No | No |
| 1 | 1 | 0 | 1 | 0 | Yes | Yes | No | No |
| 1 | 1 | 1 | 0 | 0 | Yes | Yes | No | No |
| 1 | 1 | 1 | 1 | 0 | Yes | Yes | No | No |
| 0 | 0 | 0 | 0 | 1 | No | No | No | No |
| 0 | 0 | 0 | 1 | 1 | No | No | Yes | No |
| 0 | 0 | 1 | 0 | 1 | No | No | Yes | No |
| 0 | 0 | 1 | 1 | 1 | No | No | Yes | No |
| 0 | 1 | 0 | 0 | 1 | No | No | Yes | No |
| 0 | 1 | 0 | 1 | 1 | Yes | No | Yes | No |
| 0 | 1 | 1 | 0 | 1 | Yes | No | Yes | No |
| 0 | 1 | 1 | 1 | 1 | Yes | No | Yes | No |
| 1 | 0 | 0 | 0 | 1 | No | No | No | No |
| 1 | 0 | 0 | 1 | 1 | No | No | Yes | No |
| 1 | 0 | 1 | 0 | 1 | No | No | Yes | No |
| 1 | 0 | 1 | 1 | 1 | No | No | Yes | No |
| 1 | 1 | 0 | 0 | 1 | Yes | No | Yes | No |
| 1 | 1 | 0 | 1 | 1 | Yes | No | Yes | No |
| 1 | 1 | 1 | 0 | 1 | Yes | No | Yes | No |
| 1 | 1 | 1 | 1 | 1 | Yes | No | Yes | No |

* * * * *